June 16, 1936. F. J. LEJBOWICZ 2,044,534
LOCKING DEVICE
Filed April 4, 1934 4 Sheets-Sheet 1
Fig. 2.
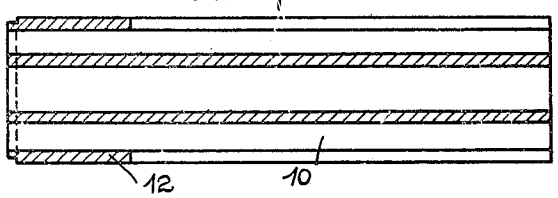
Fig. 1.
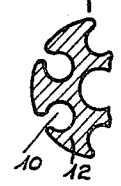
Fig. 3.
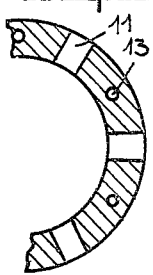
Fig. 5.
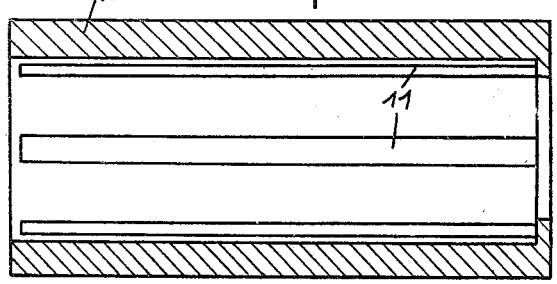
Fig. 4.
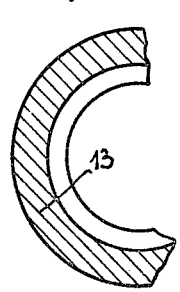
Fig. 6.
Fig. 7. Fig. 8. Fig. 9. Fig. 10.
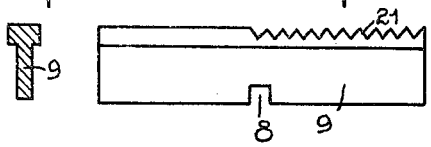
Fig. 11.
Fig. 12. Fig. 13. Fig. 14. Fig. 15. Fig. 16.
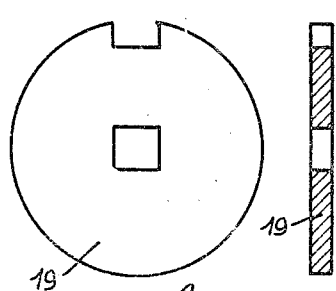
Inventor
F. J. Lejbowicz
By E. F. Wenderoth
Atty

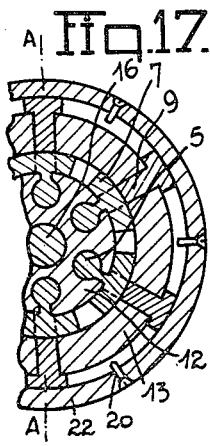
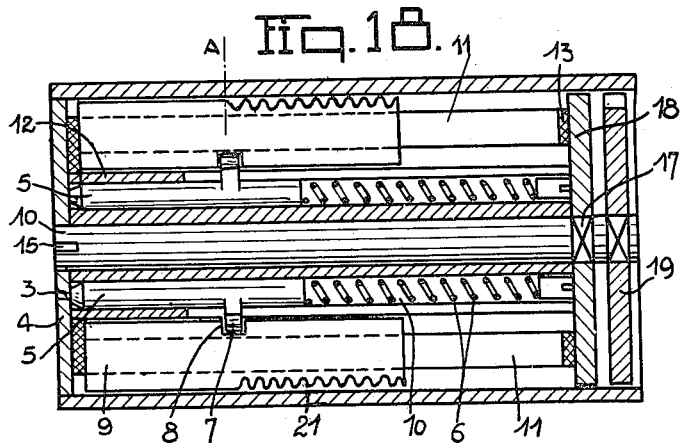
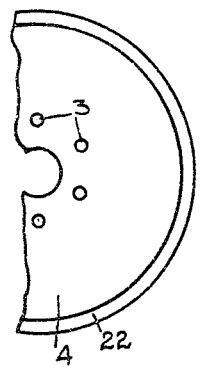
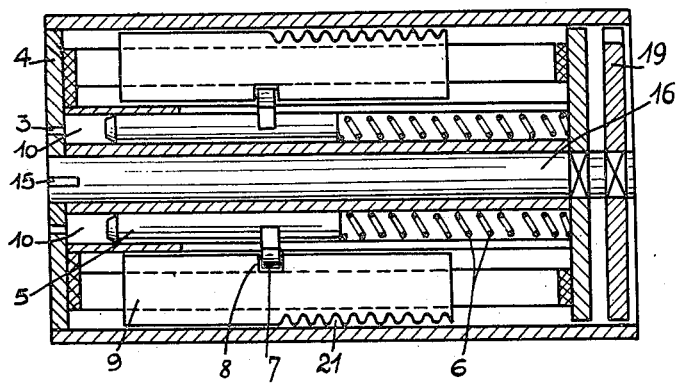
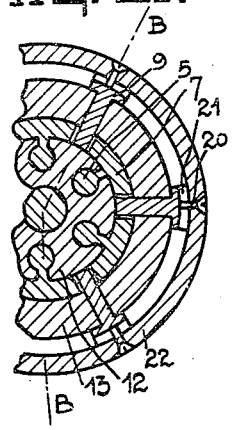
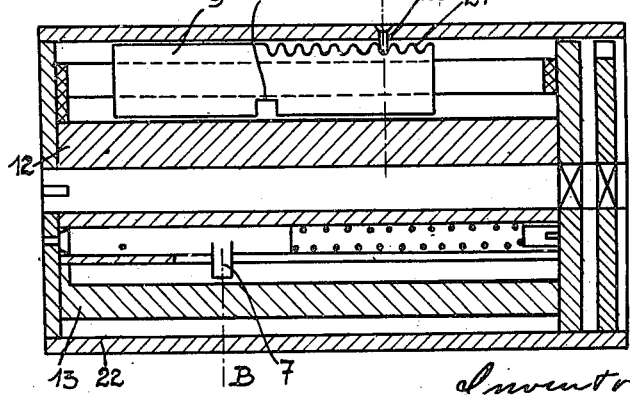

June 16, 1936. F. J. LEJBOWICZ 2,044,534
LOCKING DEVICE
Filed April 4, 1934 4 Sheets-Sheet 3
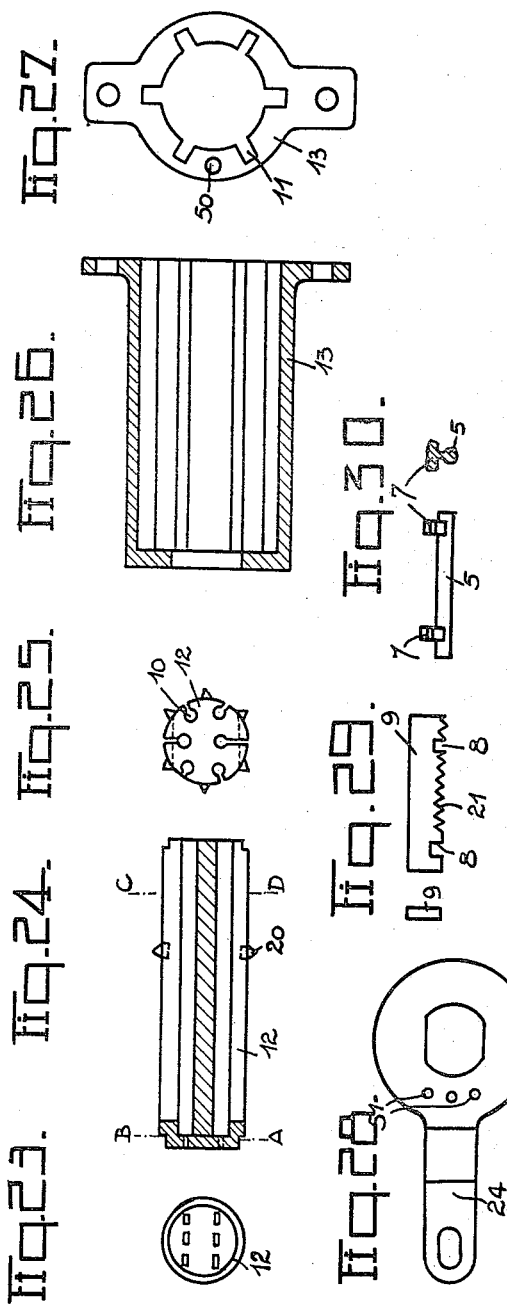
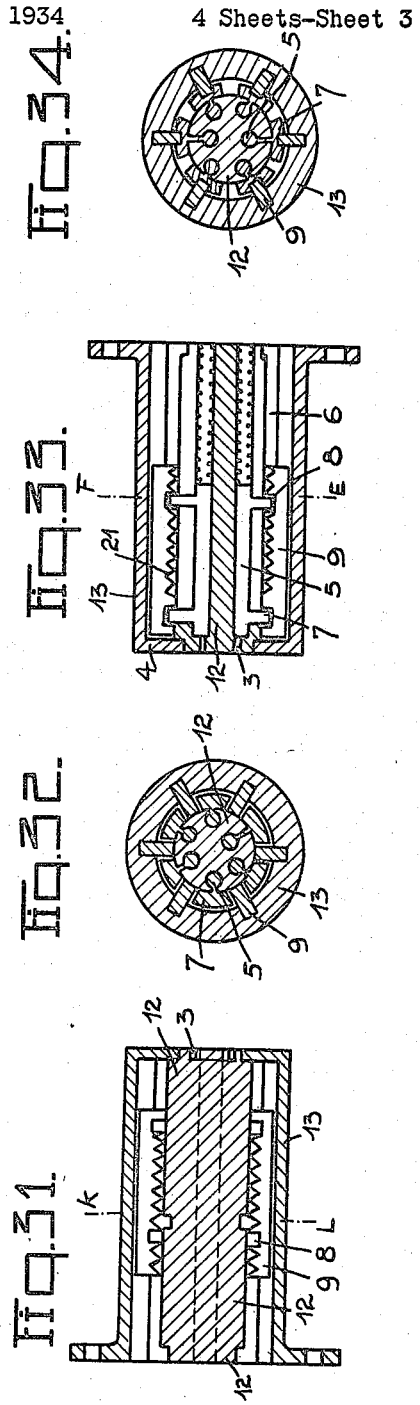
Inventor:
F. J. Lejbowicz
By E. F. Wendzoth
Atty

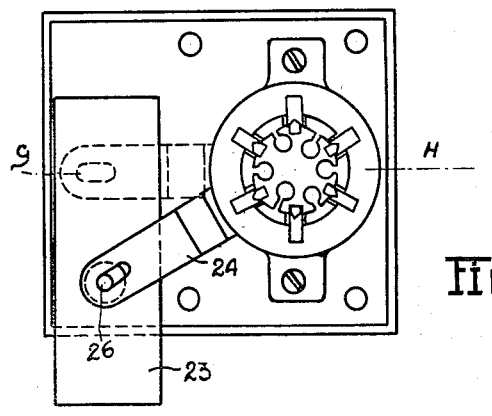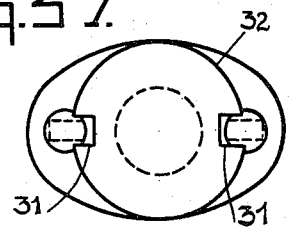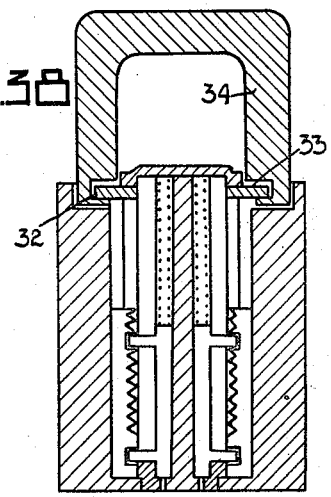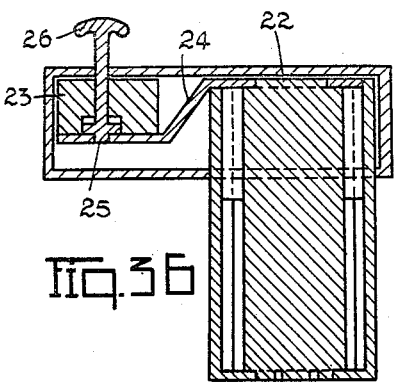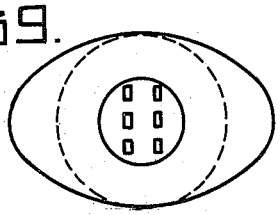

Patented June 16, 1936

2,044,534

UNITED STATES PATENT OFFICE 2,044,534

LOCKING DEVICE

Ferdinand Josef Lejbowicz, Krolewska Huta, Poland

Application April 4, 1934, Serial No. 719,017
In Poland April 13, 1933

7 Claims. (Cl. 70—70)

The present invention relates to a combination cylinder lock having longitudinally movable adjustable tumblers which are automatically set to a certain combination bitting of the key used for the locking operation and which cylinder can be then operated to unlock only by a key of identical combination of bitting.

It concerns more particularly a lock of this kind comprising in combination two cylinders arranged concentrically one inside the other, one of which being rotatably mounted and adapted to actuate the bolt, longitudinal guide grooves provided in said cylinders, movable pushers and tumblers slidably arranged in said grooves, said pushers when actuated by the bits of the key, moving against a spring action, means for connecting said pushers with said tumblers and means for locking the rotatable cylinder against rotation by said tumblers, when in any position other than that corresponding to the desired combination bitting of the key.

An object of the invention is to provide a very simple means for connecting the pushers with the tumblers without any additional intermediate part inserted between pushers and tumblers, and also an efficient means for locking the rotatable cylinder by aid of said pushers.

To this effect, according to the invention, the connecting of the pushers with the tumblers and the locking of the rotatable cylinder are effected by means of interlocking noses provided on the pushers and corresponding notches cut out of the tumblers so that only, when in their registering position, said pushers unlock the cylinder for rotation.

A further object of the invention is to provide a lock in which, when the cylinder is locked, the position of the tumblers cannot be influenced by the insertion or withdrawal of the key. To this end, according to the invention, the pushers become disconnected from the tumblers as soon as the cylinder is brought in its locked position, so that, when the key is withdrawn, said pushers alone return in their initial position, while the tumblers remain in the positions in which they have been moved by the pushers.

In order that, when the tumblers are disconnected from the pushers, they may be prevented from leaving their position, safety means are provided for locking the tumblers in these positions against any longitudinal displacement.

According to the invention, the safety means consist of toothed portions on the tumblers and pins provided adapted to engage said toothed portions when the cylinder is locked against rotation.

A further important object of the invention is to provide a lock so arranged that a change of combination is effected without any manual operation on the lock.

Another object of the invention is to provide a lock which, when open, allows the cylinder to be locked against rotation.

Other features of construction and arrangement of parts of the lock according to the invention will appear from the following description of the accompanying drawings which are however merely intended to illustrate by way of example the practical embodiment of the principles of my invention without limiting the scope to the constructions shown.

Fig. 1 is a longitudinal section through the inner cylinder of the lock; Fig. 2 is a partial front elevation of the inner cylinder and Fig. 3 is a partial vertical section of the same; Fig. 4 is a longitudinal section through the outer cylinder; Fig. 5 is a partial vertical section of the outer cylinder and Fig. 6 is a partial front elevation of the same; Fig. 7 is a section of a tumbler and Fig. 8 is a side elevation thereof; Fig. 9 is a side elevation of a pusher and Fig. 10 is a transverse section taken through the coupling nose of a pusher; Fig. 11 is a side elevation of the central stem of the lock; Fig. 12 is a radial section through a disc secured to said central stem and Fig. 13 is a side view of the disc; Fig. 14 is a side view of the key for the lock; Fig. 15 is a side view through a second disc secured to the central stem shown in Fig. 11 and Fig. 16 is a radial section of said disc; Fig. 17 is a section taken along the line A—A in Fig. 18; Fig. 18 is a longitudinal section of the lock when in open position; Fig. 19 is a partial front view of the lock; Fig. 20 is a longitudinal section through the lock, the parts of which are shown in the position they occupy when the key is introduced; Fig. 21 is a broken transverse section taken along the broken line B—B in Fig. 22; Fig. 22 is a longitudinal section through the lock, the tumblers being in their locked position; Fig. 23 is a front view of the cylinder shown in Fig. 24; Fig. 24 is a longitudinal section through the inner cylinder provided with locking pins for the tumblers; Fig. 25 is a side elevation of the inner cylinder; Fig. 26 is a longitudinal section of the outer cylinder intended for use with the cylinder shown in Fig. 24; Fig. 27 is an end elevation of the same; Fig. 28 is a plan view of the arm connecting the inner cylinder to the bolt; Fig. 29 is a side elevation of a tumbler intended to be locked by the cylinder shown in Fig. 24; Fig. 30 is a side elevation of a pusher for cooperating with the tumbler shown in Fig. 29; Fig. 31 is a longitudinal section through a lock comprising the cylinders shown in Figs. 24 and 26; Fig. 32 is a section taken along the line K—L in Fig. 31; Fig. 33 shows in longitudinal section the parts of the lock shown in Fig. 31, when in open position; Fig. 34 is a section taken along the line E—F of Fig. 33; Fig. 35 shows the connection of the inner cylinder to the bolt of the locking device; Fig. 36 is a section taken along the line G—H in Fig. 35; Fig. 37 is a front view of the new lock in the form of a padlock; Fig. 38 is a longitudinal section through the same; Fig. 39 is an end view of the same showing the key-hole.

Referring to the drawings, by introducing the bits 1 of an adjustable key, such as is illustrated for example in Fig. 14, through corresponding holes 3 provided in a front disc 4, when the lock is open (Figs. 17 to 20), the bits 1 operate axially slidable pushers 5 which are under the action of springs 6. The pushers 5 are provided with noses 7 which, when the lock is open, are in engagement with recesses 8 provided on a corresponding number of tumblers 9, and advance these tumblers when said pushers are moved forwardly (Fig. 20). The pushers 5 and tumblers 9 are guided in grooves 10 and 11 provided respectively in two cylinders 12 and 13 which are mounted concentrically one inside the other, one of these cylinders being rotatable and the other fixed.

As shown in Figs. 1 to 22, the outer cylinder 13 is rotatable, whereas the inner cylinder 12 is fixed. After the pushers 5 and tumblers 9 have been displaced in pairs through distances corresponding to the lengths of the bits 1, which distances vary according to the adjustment of the key, and after the lock has been locked by engagement of the central part 14 of the key with a slot 15 in the central rod 16 of the lock and by rotation of the cylinder 13, the pushers 5 and the recesses 8 in the tumblers 9 become disconnected. During the rotation of the central rod 16 the cylinder 13, which is rigidly secured to a disc 18 fastened on the square end 17 of this rod and also a disc 19 which is connected to the bolt of the lock which is not illustrated, or itself acts as the bolt, for example in the case of a padlock, are thus rotated, and thereby effects the locking of the lock. During the withdrawal of the key, the pushers 5 are brought back into their initial position (Fig. 18) by the action of springs 6, while the tumblers 9 remain in the position shown in Figs. 21 and 22 so that the lock is locked owing to the fact that the noses 7 of the pushers 5 and the tumblers 9 abut against one another (Fig. 21) and thus prevent any rotation of the cylinder 13. The noses 7 of the pushers 5 and the tumblers 9 are of such a thickness that, when in the position shown in Fig. 21, they form a complete ring.

In order to prevent the tumblers 9 from leaving the locking position into which they were moved by the pushers 5, they are provided with safety devices namely pins 20 which engage in a toothed part 21 of the tumblers 9, when the cylinder 13 is rotated into its locking position. As shown in Fig. 22, the pins 20 may be provided on the inside of the casing 22 which encloses the cylinders 12 and 13.

The lock after being closed can only be reopened by means of a key, the bits of which are adjusted so as to be identical with those of the key which was used for closing the lock, for only with this adjustment of the bits, when the key is introduced, can the pushers 5 reach the position in which the noses 7 can engage in the recesses 8 of the tumblers 9 and thus enable the return rotation of the cylinder 13 from its locking position to be effected. During this rotation the pins 20 leave the teeth 21 of the tumblers 9, so that these tumblers can be moved back with the pushers 5 into their initial position when the key is withdrawn from the open lock.

Figs. 23 to 34 illustrate a construction in which the inner cylinder 12 provided with the pushers 5 is arranged to rotate and is connected to the bolt of the locking device for example, by means of a crank 24 as shown in Fig. 28.

The outside casing 22 as well as the central rod 16 and the discs 18 and 19, shown in Figs. 17 to 22, may be thus advantageously dispensed with, so that only two cylinders 12 and 13 remain. The inner rotatable cylinder 12 then carries the pushers 5 and is provided with stop-pins 20 on its periphery, while the tumblers 9 are guided in axial grooves 11 provided in the outer cylinder 13. A further feature of this construction is that each pusher 5 has two noses 7 and each tumbler 9 is also provided with two recesses 8, whereby the teeth 21 are moreover arranged on the side of the tumblers 9 facing the inner cylinder 12.

The end of the rotatable inner cylinder 12 may be directly constructed as a crank or the like for operating the bolt 23 of a lock of any desired kind for example, a mortise door lock. The new lock may also be shaped like an ordinary cylinder lock and be placed on both sides of a bolting device for doors.

The novel locking device according to the invention can be brought into three different positions.

In the first position corresponding to Fig. 32, the rotatable cylinder 12 is locked and the bolt 23 is in its closing position as shown in Fig. 35. In the second position, the bolt 23 is brought into its opening position owing to a partial rotation of the cylinder, and the pushers 5 and the tumblers 9 are coupled as shown in Fig. 34, thus allowing a change of combination to be effected. In the third position into which the operative parts of the lock are brought at the end of rotation of the cylinder, the bolt 23 is still in its opening position but the pushers 5, which assume again the position shown in Fig. 32, are anew disengaged from the tumblers 9 so that the bolt can be brought into its closed position only by means of a key having the same adjustment of bits as previously selected. In order to retain the lock, that is to say its rotatable cylinder in each of the said three positions or at least in its open intermediate position, a ball 50 (Fig. 27) or the like actuated by springs, may be provided on the non-rotatable cylinder. The ball then snaps into notches or holes 51 provided for the three positions of the lock either on the rotatable cylinder 12 or on a rocking arm 24 secured or connected to the latter.

As shown in Figs. 35 and 36, the crank 24 is connected to the bolt 23 of the locking device by a pin 25 provided on the end of a knob 26 adapted to effect the displacement of the bolt by hand from inside of a door.

Figs. 37 to 39 show the novel locking device used as a padlock. The end of the rotatable inner cylinder 12 is provided with a disc 32 having one or two notches 31, as illustrated in Fig. 37. The disc 32 may be caused to engage with or to disengage from notches 33 provided for on the hasp 34 of the padlock.

The adjustable key designed for the novel locking device may have any desired form and the adjustment of the bits also may be effected in any desirable way.

Having now particularly described and ascertained the nature of my said invention and in what manner the same is to be performed, I declare that what I claim is:

1. A lock to be locked by a combination key having longitudinally adjustable bitting and to be unlocked only by a key of identical combination of bits comprising in combination a movable bolt, two cylinders arranged concentrically one inside the other, one of said cylinders being rotatably mounted and adapted to actuate said bolt, parallel longitudinal grooves provided in said cylinders, pushers slidably arranged in said grooves of the inner cylinder and simultaneously movable by the bits of the key, springs actuating said pushers so as to move them into the initial position, tumblers slidably arranged in said grooves of the outer cylinder for locking said rotatable cylinder against rotation, radial projections provided on said pushers, notches provided on said tumblers for cooperating with said projections to connect said pushers and tumblers for a common longitudinal movement and means for moving said tumblers by action of said pushers into positions corresponding to the combination bitting of the key selected, means for disconnecting said pushers from tumblers when in said positions, means for locking said rotatable cylinder by aid of said pushers and means for locking said tumblers when disconnected from said pushers.

2. A lock to be locked by a combination key having longitudinally adjustable bitting and to be unlocked only by a key of identical combination of bits comprising in combination a movable bolt, two cylinders arranged concentrically one inside the other, one of said cylinders being rotatably mounted and adapted to actuate said bolt, parallel longitudinal grooves provided in said cylinders, pushers slidably arranged in said grooves of the inner cylinder and simultaneously movable by the bits of the key, springs actuating said pushers so as to move them into the initial position, tumblers slidably arranged in said grooves of the outer cylinder for locking said inner cylinder against rotation, T-shaped lateral noses provided on said pushers and projecting outwardly of said inner cylinder, notches provided on said tumblers for connecting said pushers with said tumblers for a common longitudinal movement, said noses being of the same width as said notches so as to fill said notches when registering, said noses engaging said notches only when in a registering position previously to the rotation of said rotatable cylinder and leaving said notches after said bolt has been brought into its extreme positions, means for locking said inner cylinder by means of said pushers and means for locking said tumblers when disconnected from said pushers.

3. A lock to be locked by a combination key having longitudinally adjustable bitting and to be unlocked only by a key of identical combination of bits comprising in combination a movable bolt, two cylinders arranged concentrically one inside the other, one of said cylinders being rotatably mounted and adapted to actuate said bolt, parallel longitudinal grooves provided in said cylinders, pushers slidably arranged in said grooves of said inner cylinder and simultaneously movable by the bits of the key, springs actuating said pushers so as to move them into the initial position, tumblers slidably arranged in said grooves of the outer cylinder and for locking said inner cylinder against rotation, T-shaped lateral noses provided on said pushers and projecting outwardly of said inner cylinder, notches provided on said tumblers for connecting said pushers with said tumblers for a common longitudinal movement, said noses being of the same width as said notches so as to fill said notches when registering, said noses engaging said notches only when in a registering position previously to the rotation of said rotatable cylinder and leaving said notches after said rotatable cylinder has been rotated into its extreme positions, so that said pushers being disconnected from said tumblers are impelled by said springs into their initial positions wherein said noses take position between two tumblers, so as to lock said rotatable cylinder against rotation and means for locking said tumblers when disconnected from said pushers.

4. A lock to be locked by a combination key having longitudinally adjustable bitting and to be unlocked only by a key of identical combination of bits comprising in combination a movable bolt, an outer cylinder, an inner cylinder concentrically positioned into said outer cylinder, said inner cylinder being rotatably mounted and adapted to actuate said bolt, said outer cylinder being fixed, parallel longitudinal grooves provided in said cylinders, pushers slidably arranged in said longitudinal grooves of said inner cylinder and simultaneously movable by the bits of the key, springs actuating said pushers so as to move them into the initial position, tumblers slidably arranged in said longitudinal grooves of the outer cylinder for locking said inner cylinder against rotation, T-shaped lateral noses provided on said pushers and projecting outwardly of said inner cylinder, notches provided on said tumblers for connecting said pushers with said tumblers for a common longitudinal movement, said noses being of the same width as said notches so as to fill said notches when registering, said noses engaging said notches only when in a registering position previously to the rotation of said inner cylinder and leaving said notches after said inner cylinder has been rotated into its extreme positions, so that said pushers being disconnected from said tumblers are impelled by said springs into their initial positions wherein said noses take position between two tumblers, said noses being of such a transverse dimension that when positioned between two tumblers they laterally abut against said tumblers so as to lock said inner cylinder against rotation and means for locking said tumblers when disconnected from said pushers.

5. A lock to be locked by a combination key having longitudinally adjustable bitting and to be unlocked only by a key of identical combination of bits comprising in combination a movable bolt, an outer cylinder, an inner cylinder concentrically positioned in said outer cylinder, said inner cylinder being rotatably mounted and adapted to actuate said bolt, said outer cylinder being fixed, parallel longitudinal grooves provided in said cylinders, pushers slidably arranged in said longitudinal grooves of said inner cylinder and simultaneously movable by the bits of the key, springs actuating said pushers so as to move them into the initial position, tumblers slidably arranged in said longitudinal grooves of the outer cylinder for locking said inner cylinder against rotation, T-shaped lateral noses provided on said pushers and projecting outwardly of said inner cylinder, notches provided on said tumblers for connecting said pushers with said tumblers for a common longitudinal movement, said noses being of the same width as said notches so as to fill said notches when registering, said noses engaging said notches only when in a registering position previously to the rotation of said inner cylinder and leaving said notches after said inner cylinder has been rotated into its extreme positions, so that said pushers being disconnected from said tumblers are impelled by said springs into their initial positions wherein said noses take position between two tumblers, said noses being of such a transverse dimension that when positioned between two tumblers they laterally abut against said tumblers so as to lock said inner cylinder against rotation, a toothed portion provided on said tumblers and pins adapted to engage said toothed portions of said tumblers when disconnected from said pushers so as to secure said tumblers against any axial displacement.

6. A lock to be locked by a combination key having longitudinally adjustable bitting and to be unlocked only by a key of identical combination of bits comprising in combination a movable bolt, an outer cylinder, an inner cylinder concentrically positioned in said outer cylinder, said inner cylinder being rotatably mounted and adapted to actuate said bolt, said outer cylinder being fixed, parallel longitudinal grooves provided in said cylinders, pushers slidably arranged in said longitudinal grooves of said inner cylinder and simultaneously movable by the bits of the key, springs actuating said pushers so as to move them into the initial position, tumblers slidably arranged in said longitudinal grooves of the outer cylinder for locking said inner cylinder against rotation, T-shaped lateral noses provided on said pushers and projecting outwardly of said inner cylinder, notches provided on said tumblers for connecting said pushers with said tumblers for a common longitudinal movement, said noses being of the same width as said notches so as to fill said notches when registering, said noses engaging said notches only when in a registering position previously to the rotation of said inner cylinder and leaving said notches after said inner cylinder has been rotated into its extreme positions, so that said pushers being disconnected from said tumblers are impelled by said springs into their initial positions wherein said noses take position between two tumblers, said noses being of such a transverse dimension that when positioned between two tumblers they laterally abut against said tumblers so as to lock said inner cylinder against rotation, a toothed portion provided on said tumblers opposite said inner cylinder and pins secured on said inner cylinder between said longitudinal grooves thereof and adapted to engage said toothed portions of said tumblers when disconnected from said pushers so as to secure said tumblers against any axial displacement.

7. A lock to be locked by a combination key having longitudinally adjustable bitting and to be unlocked only by a key of identical combination of bits comprising in combination a movable bolt, an outer cylinder, an inner cylinder concentrically positioned in said outer cylinder, said inner cylinder being rotatably mounted and adapted to actuate said bolt, said outer cylinder being fixed, parallel longitudinal grooves provided in said cylinders, pushers slidably arranged in said longitudinal grooves of said inner cylinder and simultaneously movable by the bits of the key, springs actuating said pushers so as to move them into the initial position, tumblers slidably arranged in said longitudinal grooves of the outer cylinder for locking said inner cylinder against rotation, T-shaped lateral noses provided on said pushers and projecting outwardly of said inner cylinder, notches provided on said tumblers for connecting said pushers with said tumblers for a common longitudinal movement, said noses being of the same width as said notches so as to fill said notches when registering, said noses engaging said notches only when in a registering position previously to the rotation of said inner cylinder and leaving said notches after said inner cylinder has been rotated into its extreme positions, so that said pushers being disconnected from said tumblers are impelled by said springs into their initial positions wherein said noses take position between two tumblers, said noses being of such a transverse dimension that when positioned between two tumblers they laterally abut against said tumblers so as to lock said inner cylinder against rotation, a toothed portion provided on said tumblers opposite said inner cylinder and pins secured on said inner cylinder between said longitudinal grooves thereof and adapted to engage said toothed portions of said tumblers when disconnected from said pushers so as to secure said tumblers against any axial displacement, said inner cylinder being rotatable through an angle allowing a pusher to take position consecutively on both sides of a tumbler so that the bolt of the lock is locked in its end positions.

FERDINAND JOSEF LEJBOWICZ.